Sept. 3, 1968  J. R. YODER ET AL  3,400,266

INFRARED RADIOMETRIC MICROSCOPE

Filed Dec. 2, 1964  2 Sheets-Sheet 1

INVENTOR
JOHN R. YODER
RICHARD F. LEFTWICH
DONALD W. FISHER

Joseph Levinson
ATTORNEY

INVENTOR
JOHN R. YODER
RICHARD F. LEFTWICH
DONALD W. FISHER

United States Patent Office 3,400,266
Patented Sept. 3, 1968

3,400,266
INFRARED RADIOMETRIC MICROSCOPE
John R. Yoder, Westport, Conn., Richard F. Leftwich, Pound Ridge, N.Y., and Donald W. Fisher, Norwalk, Conn., assignors to Barnes Engineering Company, Stamford, Conn., a corporation of Delaware
Filed Dec. 2, 1964, Ser. No. 415,433
2 Claims. (Cl. 250—83.3)

ABSTRACT OF THE DISCLOSURE

Non-contact temperature measurements of small areas are provided by focusing an objective on a sample whose temperature is to be measured and applying the radiation through a beam splitter and a chopper to an infrared detector. A visual channel having an eyepiece and which includes means for reducing the magnification of the sample in the visual channel is in optical alignment with the beam splitter for allowing simultaneous viewing of the area whose temperature is being measured. The signals derived from the detector are processed by electronic means including an emissivity control means which provides direct temperature readings of the sample.

---

Figure 1:
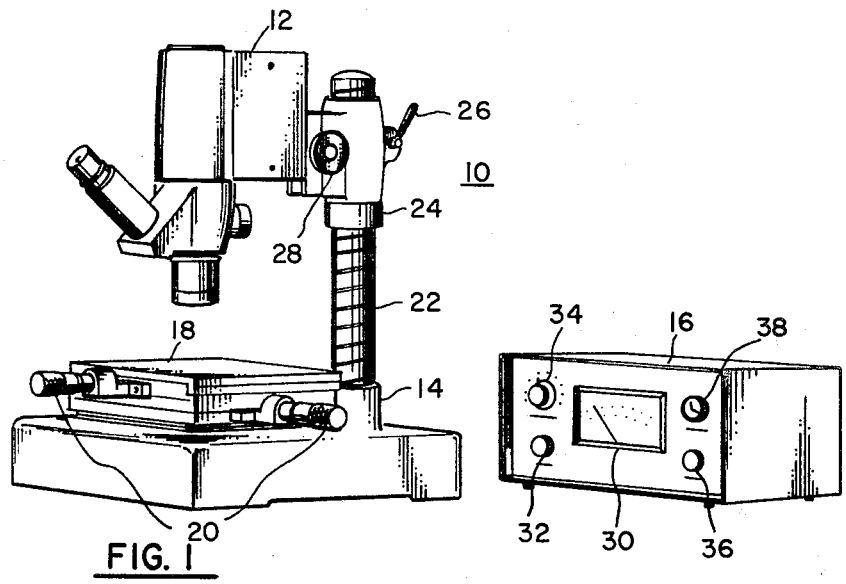

This invention relates to an infrared radiometric microscope.

Miniaturization has been advancing at a rapid pace with the introduction of more solid-state devices, integrated circuits, microcircuits, and the like. The smaller and smaller size of these components and circuits presents ever-increasing difficulty in the design, development, and manufacture of circuits and components of the aforesaid type. Predicting the performance of such devices, and their reliability, is also becoming a greater problem because of the size of the components and circuits. It has been found that even the most stringent electrical testing techniques are not capable of detecting some flaws which produce early failure of these miniscule components. One approach to the problem is the use of infrared inspection. This technique is based on the fact that every object at a temperature above absolute zero emits infrared energy. The infrared energy is received by an infrared detector, and converted into an electrical output that is indicative of the temperature of the target. Infrared inspection is effective because it requires no physical contact with the specimen under test. For example, the use of a probe such as a thermocouple, or any other device which contacted the specimen would conduct heat away from the specimen and change the very temperature which is to be measured. Scanning type radiometers have been used in non-destructive testing of larger circuit configurations, such as printed circuit boards. However, these devices are not suitable for measuring the temperature of a very small spot. It would be desirable to measure the radiation emitted from a small target spot, for example on the order of .001″, whereas a typical scanning radiometer measures on the order of an ⅛″ spot. With a spot of such small size, it would also be most desirable to visually view the target spot at the same time that a radiometric measurement is being made, in order that the operator may precisely determine where the measurement is being made.

Accordingly, it is an object of this invention to provide a new and improved infrared radiometric microscope for measuring radiation from a small spot which allows simultaneous viewing and selecting of a spot whose radiation is being measured.

In order to obtain simultaneous radiometric and visual viewing, the present invention employs a dichroic beam splitter. To do so, the required optical path must be provided which in turn requires the necessary space. At the same time the field of view of the visual channel must be sufficiently wide so that the observer will be able to identify what he is measuring.

Therefore, it is another object of this invention to provide a new and improved radiometric microscope for simultaneous radiometric and visual viewing in which the visual channel has a wide field of view to enable the observer to identify the area whose radiation is being measured.

Brief reference has been previously made to the radiometric portion of the microscope, which includes an infrared detector which converts the terminal energy received from a target under examination into an electrical signal which, after amplification and processing, produces an output signal that is indicative of the temperature of the target. Using this output signal, and taking into account the emissivity of the target whose radiation is measured, the actual temperature of the object can be arrived at. The emissivity of the object must be considered, since the intensity of the radiation therefrom is directly related to the object's emissivity. Emissivity of a subject is the ratio between the radiant emittance of a subject and the radiant emittance of a theoretically perfect emitter, referred to as a "black body." Accordingly, actual emissivities are always less than 1, and range from as low as .1 to as high as .9. Knowing the emissivities of each area under test, it would be a decided advantage if the emissivity factor could be accounted for in the electronic processing of the signal received from the infrared detector so that direct temperature indications can be provided either by meter or recording, without having first to calculate or factor in the emissivity of the object under test.

It is therefore a further object of this invention to provide an emissivity control in a radiometric device, thereby providing a direct temperature indication of the target being tested.

A still fuurther object of this invention is to provide a new and improved radiometric microscope which provides reliable performance and convenience of operation.

Still another object of this invention is to provide a new and improved radiometric microscope which has the flexibility of construction to accommodate a wide range of applications.

In carrying out this invention, a radiometric microscope is provided having an infrared channel which includes an infrared detector for receiving radiation from a sample under test, and a visual channel for viewing the sample. A dichroic beam splitter separates the visible portion of the spectrum and reflects it to the visual channel while passing only the infrared wavelengths to the infrared detector for electronic processing. In this way, the specimen under test may be viewed for precisely selecting the spot whose temperature is to be measured. For direct temperature reading, an electronic processing circuit is provided with an emissivity control. An additional feature of the visual channel is the provision of a wide field of view for the observer which helps him to identify the area being radiometrically observed.

Figure 2:
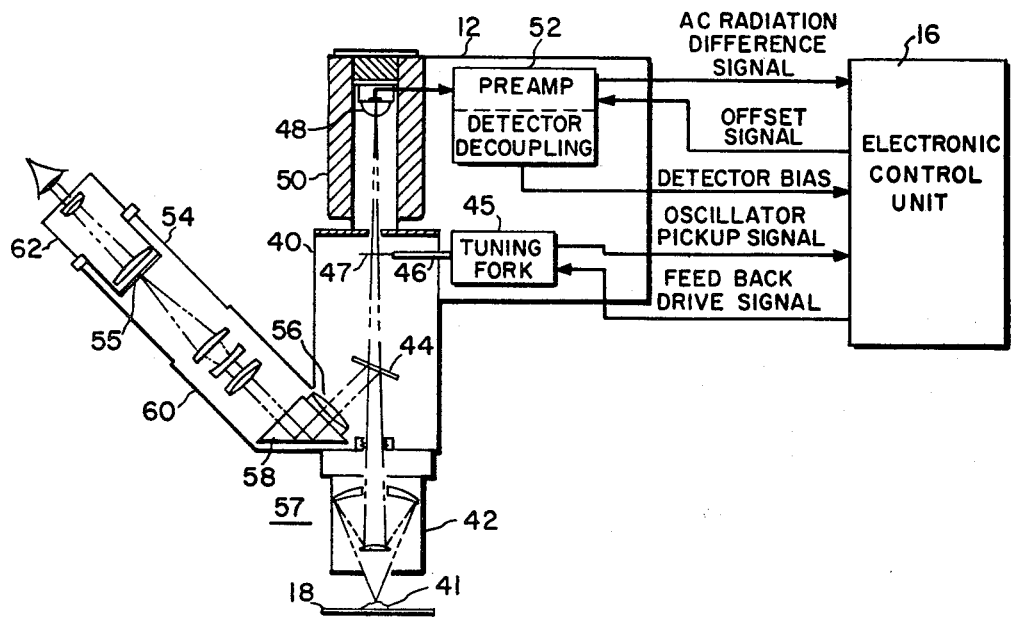
Figure 3:
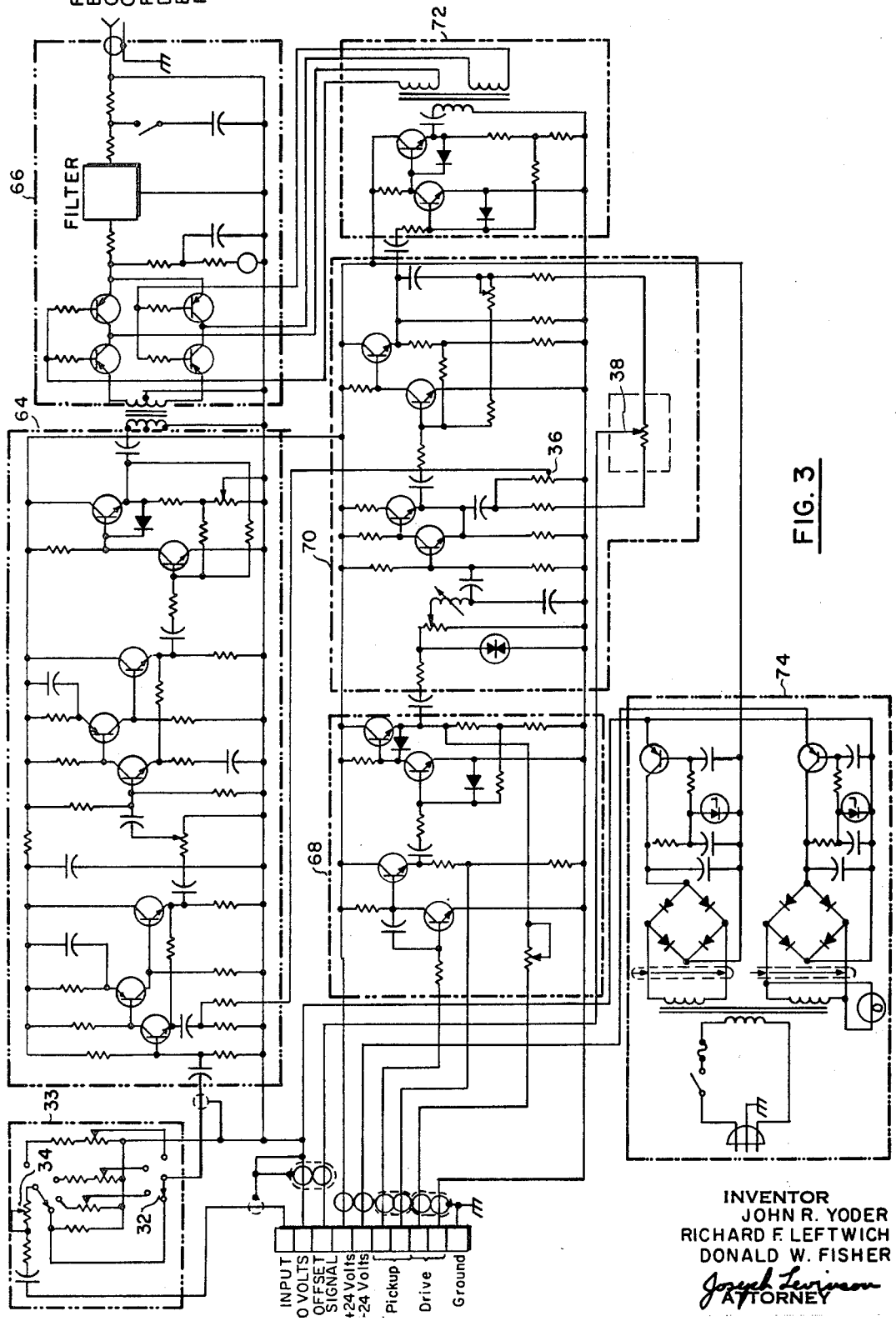

The invention, both as to organization and method of operation, together with further objects and advantages thereof, may best be understood by reference to the following description taken in connection with the accompanying drawings, in which:

FIG. 1 is an isometric view of an infrared radiometric microscope embodied in this invention, FIG. 2 is an optical schematic diagram which includes the electronics in block form for the instrument shown in FIG. 1, and FIG. 3 is an electrical schematic diagram of the electronic control unit shown in FIGS. 1 and 2.

Referring now to FIG. 1, an infrared radiometric microscope, referred to generally with the reference character 10, comprises a microscope head 12 mounted on a stand 14 and an electronic control unit 16. An x–y specimen stage 18 is positioned on the stand 14, and a specimen which is desired to be examined is positioned by means of two micrometer screws 20. The infrared radiometric microscope 10 may be equipped with a plurality of manually operated specimen stages, or motorized drive stages which would make the instrument suitable for automatic or semiautomatic production testing. Focusing for the microscope 10 is accomplished by a rack 22 and a pinion 24 with a coarse adjustment being provided by knob 26 and a fine adjustment being provided by knob 28 in conjunction with another rack and pinion (not shown). The electronic control unit includes a multiple scale meter 30, a scale control 32, an emissivity control 34, an ambient set control 36, and a zero set control 38. The electronic control unit 16 and the aforesaid controls will be described more fully in connection with FIG. 3.

As will be more clearly seen in FIG. 2, the microscope head 12 includes an infrared channel, generally referred to with the reference character 40, and a visual channel, generally referred to with the reference numeral 54. The infrared channel includes a reflecting objective 42, comprised of primary and secondary mirrors, which collects energy from a sample or specimen 41 which is being examined, and focuses it onto a detector 48. The radiant energy collected by the reflecting objective 42 is first passed through a beam splitting element 44, for example a germanium dichroic element, which separates the visible from the infrared wavelengths, and reflects the visible light into the visual channel 54, which will be explained subsequently. After the radiant energy of the infrared wavelength passes through the beam splitting element 44, it is acted on by a tuning fork chopper 45 having vibrating tines 46 to one of which is attached a single blackened blade 47 which extends into the infrared channel 40 which serves to periodically intercept the infrared radiation. As the tines 46 oscillate, thereby moving the blade 47, the detector 48 alternately receives radiation from the target 41 and then from the blackened blade 47, which serves as a reference. The infrared detector 48 is mounted in a detector housing 50. The detector shown in FIG. 2 is a hyperimmersed thermistor bolometer, which is the preferred form. This type of detector is provided with a hyperhemispherical immersion lens of germanium, which passes infrared energy in the wavelength region between approximately 2 and 20 microns. An advantage is achieved with the use of this type of detector because the detector requires no cooling to extend its range to the far infrared. However, if deemed desirable for a specific application, other types of infrared detectors may be utilized. The detector 48 receives alternate radiation impulses resulting from the operation of the tuning fork chopper 45, and its output is an electrical A.C. signal that is proportional to the difference between the target and reference radiation levels. This signal is applied to a preamplifier 52 and from there to the electronic control unit 16. The use of the tuning fork chopper provides an advantage in its compact size and the fact that it does not require a motor for driving it.

The visual channel 54 includes a negative collimating lens referred to generally with the reference character 57, which is comprised of a doublet lens 56, a prism 58, a focusing lens system 60, a reticle 55, and an eyepiece 62. In operation, the beam splitting element 44 separates the visible radiation from the infrared, and reflects the visible light into the visual channel 54 via the negative collimating lens system 56 through the focusing system 60, and on to the eyepiece 62 which permits continuous viewing of the target 41 while thermal measurements are made. The reticle 55 serves to define the location of the detector field of view. The short-focus, high magnification produced by the reflecting objective 42 produces a primary visible image which has an undesirably high magnification, thus giving a reduced visual field of view. The optics of the visual channel 54 reduce the magnification to increase the field of view of the visible channel 54. The wider field of view which is provided by the optics in the visual channel 54 results in greater ease in target orientation.

The electronic control unit 16 is shown in complete schematic form in FIG. 3 in order to illustrate one detailed form of carrying out the electronic control unit portion of the system. However, for the purpose of simplifying the explanation, the description is made with reference to block form. The electronic control unit 16 is comprised of a scale and emissivity control 33, a postamplifier 64, a synchronous demodulator 66, a power supply 74, a chopper drive circuit 68, an offset generator 70, and a synchronous demodulator drive 72. The controls shown on FIG. 1 contain the same reference numerals as the circuit components providing such control as shown in FIG. 3. Also, the terminals shown on FIG. 3 are connected to the preamplifier 52 and the tuning fork chopper 45 as shown in FIG. 2. In operation, input signals applied to the electronic control unit 16, which comprises the A.C. radiation difference signal from preamplifier 52, is applied via an emissivity control 34, which is a gain control for the electronic control unit. A scale switch 32 is also provided and is designed in the illustrative embodiment of FIG. 3 to cover a wide temperature range from 15° C. to 65° C., and from 65° C. to 165° C. An additional radiance scale permits measurement of higher target temperatures. The output of the scale and emissivity control 33 is applied to a postamplifier 64, and from there to a synchronous demodulator 66, whose output may be read on a meter 30, and if desired, applied through a filter to an oscilloscope or standard type of recorder. Tuning fork chopper 45 is connected to a chopper drive 68, where the tuning fork output is amplified and fed back to the tuning fork to maintain oscillation. The tuning fork drive 68 also feeds an offset generator 70 which provides an electronic offset signal at ambient set control 36 and at zero set control 38. The offset generator output is also applied to a synchronous demodulator drive 72 whose output is applied to the synchronous demodulator 66. The entire control unit, as well as the preamplifier 52 and detector 48 are powered by a power supply 74.

As was previously pointed out, the amount of power radiated by a target at a given temperature is directly proportional to the surface emissivity of the target. The highest possible value of emissivity is unity, which applies only to a black body, and in order to read radiometric outputs of gray bodies directly in terms of target temperature, it is necessary to know their emissivities and to compensate for these emissivity values. Before this compensation is made, compensation must be provided for any difference in temperature between the chopper blade 47 and the detector 48. To this end, an electronic temperature offset voltage is provided by the offset generator 70 at the zero set control 38, which is applied to the input of the preamplifier 52. Since the offset signal provided from the zero set control 38 is of the same frequency and phase as the radiation signal from the chopper, the resulting signal from any difference in temperature between the detector and the chopper blade is eliminated in the preamplifier. Therefore, the signal from the preamplifier for ambient targets is thus zero. With this compensation provided, the gain control may be set so that gain $x$ emissivity=unity. Accordingly, the gain or emissivity control 34 can be set to provide an emissivity compensation if the emissivity of the target is known. The signal applied from the emissivity control to the postamplifier will not permit the meter 30 to read absolute temperatures. Accordingly, another electronic voltage offset is applied to the postamplifier 64 from the offset signal generator 70 at ambient set control 36. This control is set in accordance with the ambient temperature in which the target is being examined. Recapping the procedure for providing the emissivity control and direct temperature readings, the electronic temperature offset applied from ambient set 36 is turned off, and an offset signal from zero set control 38 is applied to the preamplifier to get an A.C. zero reading on the meter 30. Then the ambient temperature offset control 36 is adjusted to equal the ambient temperature on the meter 30 in accordance with room temperature taken from a thermometer in the location where the target is being examined. The emissivity control can be set to the known value either before or after this last step. This emissivity control is not limited in its applications to the infrared radiometric microscope, but may be utilized in any radiometric instrument where it is desirable to provide an emissivity compensation.

The infrared radiometric microscope as embodied in this invention is a rugged, reliable, and easy-to-operate instrument with wide utility. Readily interchangeable combinations of objectives and detectors adapt the performance characteristics of this instrument to a wide range of applications. Its high temperature sensitivity allows detection of temperature difference of a fraction of a degree centigrade, and its emissivity control enables direct measurement of temperature for objects of known emissivity. In its preferred form, with the use of an immersed thermistor detector, it provides uniform response to infrared radiation from the 2 to 20 micron band, and requires no complex, expensive cooling apparatus. The infrared microscope's wide field of view permits the operator to view the target while making radiation measurements. The instrument has a wide temperature range, and with readily available manual, semiautomatic, or automatic specimen stages, a wide variety of specimens of different shape and temperature may be examined.

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

What we claim as new and desire to secure by Letters Patent is:

1. An infrared radiometric microscope for providing simultaneously visual observation and infrared radiometric measurement of a sample under examination, comprising
   (a) an infrared channel having in optical alignment an objective focused on a sample under examination, a beam splitting element for passing infrared radiation and reflecting visual radiation, a radiation chopper and an infrared detector for receiving infrared radiation from said sample,
   (b) a visual channel including an eyepiece and optical means in optical alignment with said beam splitting element for receiving visual radiation from said sample reflected from said beam splitting element,
   (c) a preamplifier connected to said infrared detector for amplifying signals received from said detector,
   (d) a gain control connected to said preamplifier,
   (e) a postamplifier connected to said gain control,
   (f) a synchronous demodulator connected to said postamplifier,
   (g) a chopper drive connected to said radiation chopper,
   (h) an offset generator connected to said chopper drive,
   (i) a synchronous demodulator drive circuit connected between said offset generator and said synchronous demodulator, and
   (j) means for connecting said offset generator to said preamplifier and said postamplifier.

2. A radiometric device for measuring temperatures of samples being examined in accordance with infrared radiation emitted therefrom in which the radiometric outputs are independent of emissivity and such outputs are capable of directly indicating the temperature of said objects without further calibration or computation, comprising, in combination,
   (a) a radiation detector and a chopper for periodically interrupting radiation applied to said detector from samples being examined,
   (b) a preamplifier, a gain control and a postamplifier connected to said detector in the order named,
   (c) an electronic temperature offset generator,
   (d) means for applying a voltage to said preamplifier from said offset generator to subtract from said electrical signal an amount equal to any difference in temperature between said detector and said chopper,
   (e) said gain control comprising said emissivity control which is set so that said electrical signal is multiplied by 1/emissivity of the area of the sample under examination, and
   (f) means for applying a voltage to said postamplifier from said offset generator which is equivalent to ambient temperature radiation whereby said resulting signal provided by said electronic control means is independent of the emissivity of the sample and is capable of being visually displayed without further calibration.

References Cited
UNITED STATES PATENTS

| | | | |
|---|---|---|---|
| 2,960,612 | 11/1960 | Koulicouitch. | |
| 3,081,632 | 3/1963 | Howell. | |
| 3,169,189 | 2/1965 | Barnes et al. | 250—83.3 |
| 3,057,200 | 10/1962 | Wood | 88—22.5 X |
| 3,173,012 | 3/1965 | De Winter | 250—83.3 |
| 3,179,805 | 4/1965 | Astheimer | 250—83.3 |
| 3,293,915 | 12/1966 | Banca et al. | 73—355 |
| 3,297,873 | 1/1967 | Hornanian et al. | 250—71 |

OTHER REFERENCES

Walker, Roschen, and Schlegel, An Infrared Scanning Technique, IEEE Transactions, ED-10, No. 4, July 1963, p. 263.

Schlegel, E. S., Review of Scientific Instruments, vol. 34, No. 4, April 1963, p. 360.

RALPH G. NILSON, *Primary Examiner.*

S. ELBAUM, *Assistant Examiner.*